United States Patent [19]
Whitfield

[11] Patent Number: 5,995,824
[45] Date of Patent: Nov. 30, 1999

[54] CELLULAR PHONE VOICE RECORDER

[75] Inventor: Patrick Whitfield, Garland, Tex.

[73] Assignee: Ericsson Inc., Research Triangle Park, N.C.

[21] Appl. No.: 08/969,879

[22] Filed: Nov. 14, 1997

[51] Int. Cl.$^6$ .................................................. H04M 11/10
[52] U.S. Cl. ........................... 455/412; 455/413; 455/414
[58] Field of Search .................................... 455/575, 556, 455/560, 412, 413, 414; 379/88.01, 88.03, 88.22, 88.23, 88.24, 88.25, 88.26, 202, 204, 205, 206, 210, 211, 212, 214

[56] References Cited

U.S. PATENT DOCUMENTS

| | | | |
|---|---|---|---|
| 4,875,229 | 10/1989 | Palett et al. | 455/550 |
| 5,400,393 | 3/1995 | Knuth et al. | 379/88.22 |
| 5,506,888 | 4/1996 | Hayes et al. | 455/445 |
| 5,544,231 | 8/1996 | Cho | 379/88.24 |
| 5,548,636 | 8/1996 | Bannister et al. | 379/201 |
| 5,711,011 | 1/1998 | Urs et al. | 455/520 |
| 5,740,543 | 4/1998 | Maeda | 455/550 |
| 5,752,188 | 5/1998 | Astrom et al. | 455/433 |
| 5,758,279 | 5/1998 | Foti | 455/412 |
| 5,790,957 | 8/1998 | Heidari | 455/553 |
| 5,867,793 | 2/1999 | Davis | 455/556 |

FOREIGN PATENT DOCUMENTS

| | | |
|---|---|---|
| 0 686 909 A1 | 12/1995 | European Pat. Off. . |
| 0 762 711 A2 | 3/1997 | European Pat. Off. . |
| 2 732 846 A1 | 10/1996 | France . |
| 2 289 192 | 11/1995 | United Kingdom . |

OTHER PUBLICATIONS

Chris Schmandt; Phoneshell: the Telephone as Computer Terminal; Proceedings of First ACM International Conference on Multimedia, Anaheim, California, Aug. 2–6, 1993; Jan. 1993; pp. 373–382.

PCT International Search Report dated Mar. 17, 1999.

*Primary Examiner*—Doris H. To
*Assistant Examiner*—Charles N. Appiah
*Attorney, Agent, or Firm*—Jenkens & Gilchrist, P.C.

[57] ABSTRACT

A telecommunications system and method for providing cellular phone voice recording to subscribers, in order to simplify the recording of information while using a mobile terminal, and to increase the safety of the subscriber while operating a motor vehicle. For example, during a call, a subscriber may initiate the recording feature by pressing a dedicated key or a sequence of keys on the cellular phone. This feature can be implemented completely within the cellular phone itself, or it can be implemented in the Mobile Services Center/Visitor Location Register (MSC/VLR). With this feature, a subscriber can record information at any time during a call without the need for recording materials, e.g., paper or the scratch pad function on the cellular phone, which both increases the safety of the subscriber while driving, and provides a convenient manner of recording information.

17 Claims, 3 Drawing Sheets

CELLULAR PHONE VOICE RECORDER

BACKGROUND OF THE PRESENT INVENTION

1. Field of the Invention

The present invention relates generally to telecommunications systems and methods for recording information during phone calls, and specifically to providing a technique for recording information to a memory unit during a call, using the subscribers mobile terminal, for later retrieval by the subscriber.

2. Background and Objects of the Present Invention

Cellular telecommunications is one of the fastest growing and most demanding telecommunications applications ever. Today it represents a large and continuously increasing percentage of all new telephone subscriptions around the world. A standardization group, European Telecommunications Standards Institute (ETSI), was established in 1982 to formulate the specifications for the Global System for Mobile Communication (GSM) digital mobile cellular radio system.

With reference now to FIG. 1 of the drawings, there is illustrated a GSM Public Land Mobile Network (PLMN), such as cellular network 10, which in turn is composed of a plurality of areas 12, each with a Mobile Services Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a mobile station (MS) (terminal) 20 may move freely without having to send update location information to the MSC/VLR area 12 that controls the LA 18. Each Location Area 12 is divided into a number of cells 22. Mobile Station (MS) 20 is the physical equipment, e.g., a car phone or other portable phone, used by mobile subscribers to communicate with the cellular network 10, each other, and users outside the subscribed network, both wireline and wireless.

The MSC 14 is in communication with at least one Base Station Controller (BSC) 23, which, in turn, is in contact with at least one Base Transceiver Station (BTS) 24. The BTS is the physical equipment, illustrated for simplicity as a radio tower, that provides radio coverage to the geographical part of the cell 22 for which it is responsible. It should be understood that the BSC 23 may be connected to several base transceiver stations 24, and may be implemented as a stand-alone node or integrated with the MSC 14. In either event, the BSC 23 and BTS 24 components, as a whole, are generally referred to as a Base Station System (BSS) 25.

With further reference to FIG. 1, the PLMN Service Area or cellular network 10 includes a Home Location Register (HLR) 26, which is a database maintaining all subscriber information, e.g., user profiles, current location information, International Mobile Subscriber Identity (IMSI) numbers, and other administrative information. The HLR 26 may be co-located with a given MSC 14, integrated with the MSC 14, or alternatively can service multiple MSCs 14, the latter of which is illustrated in FIG. 1.

The VLR 16 is a database containing information about all of the Mobile Stations 20 currently located within the MSC/VLR area 12. If a MS 20 roams into a new MSC/VLR area 12, the VLR 16 connected to that MSC 14 will request data about that Mobile Station 20 from the HLR database 26 (simultaneously informing the HLR 26 about the current location of the MS 20). Accordingly, if the user of the MS 20 then wants to make a call, the local VLR 16 will have the requisite identification information without having to reinterrogate the HLR 26. In the aforedescribed manner, the VLR and HLR databases 16 and 26, respectively, contain various subscriber information associated with a given MS 20.

In today's society, there is an increasing usage of cellular phones by subscribers while operating motor vehicles. In order for a subscriber to record information, e.g., phone numbers, names, or addresses, while using their cellular phone, the information must either be written down on a piece of paper or, if available, a scratch pad function on the subscribers cellular phone can be used. However, both of these alternatives normally require two hands and would cause the subscriber to look away from the road. This is undesirable, as it increases the possibility that the subscriber might be involved in an automobile accident.

It is therefore an object of the invention to allow a subscriber to record information while using their cellular phone without interfering with the subscriber's operation of a motor vehicle.

It is a further object of the invention to implement a voice recording mechanism within the mobile station itself.

It is still a further object of the invention to enable network operators to provide voice recording services to subscribers during a call to or from the subscriber.

SUMMARY OF THE INVENTION

The present invention is directed to telecommunications systems and methods for providing cellular phone voice recording to subscribers, which both simplifies the recording of information while using a mobile terminal, and increases the safety of the subscriber while operating a motor vehicle. For example, during a call, a subscriber may initiate the recording feature by pressing a dedicated key or a sequence of keys on the cellular phone. This feature can be implemented completely within the cellular phone itself, or it can be implemented in the MSC/VLR. With this feature, a subscriber can record information at any time during a call without the need for recording materials, e.g., paper or the scratch pad function on the cellular phone, which both increases the safety of the subscriber while driving, and provides a convenient manner of recording information. In addition, if implemented in the network, this feature will provide increased revenue for the network operator. Furthermore, manufacturers of cellular phones containing this voice recording feature will have the advantage of product distinction in the market.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
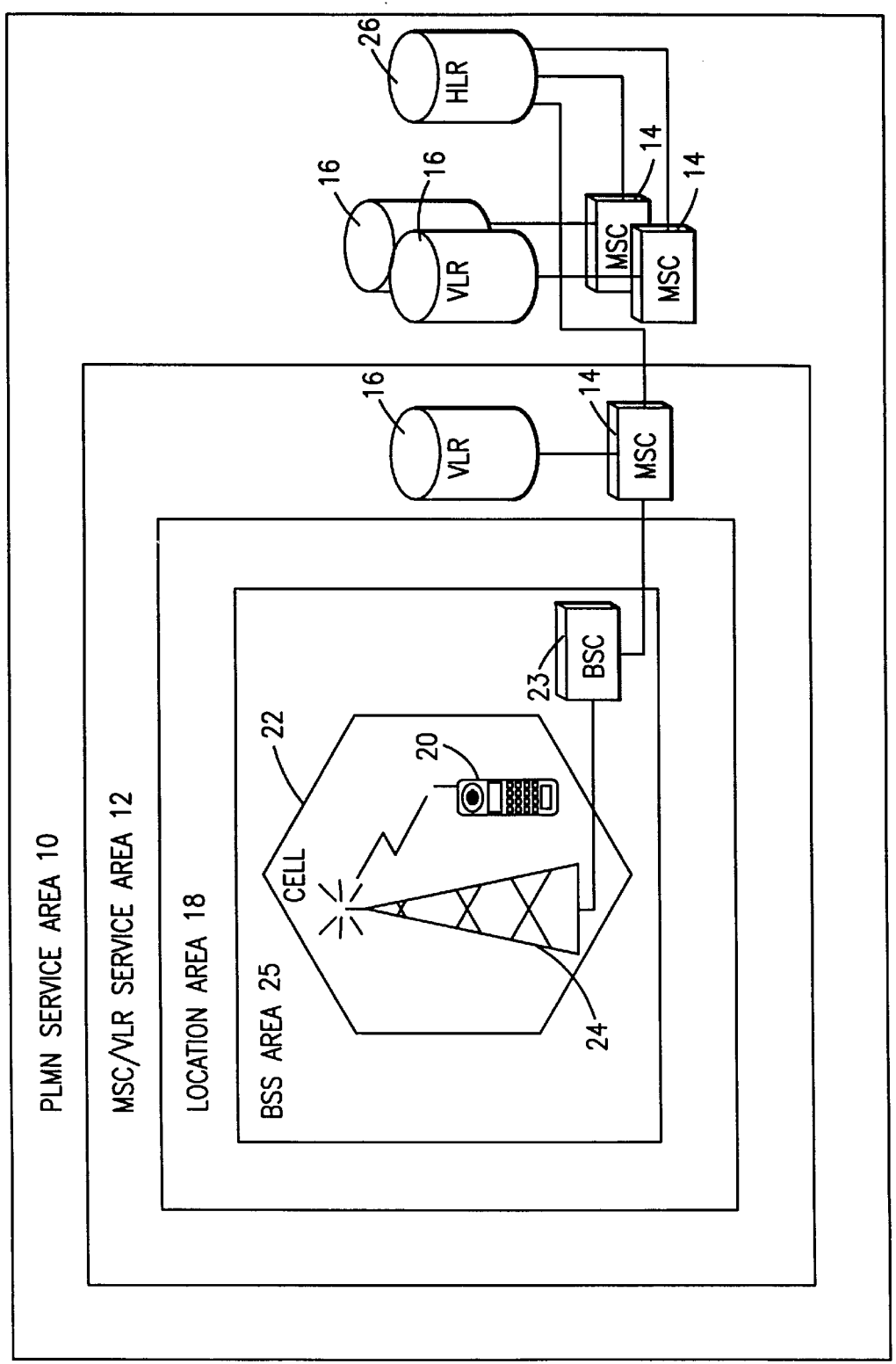
FIG. 1 is a block diagram of a conventional terrestrially-based wireless telecommunications system.
Figure 2:
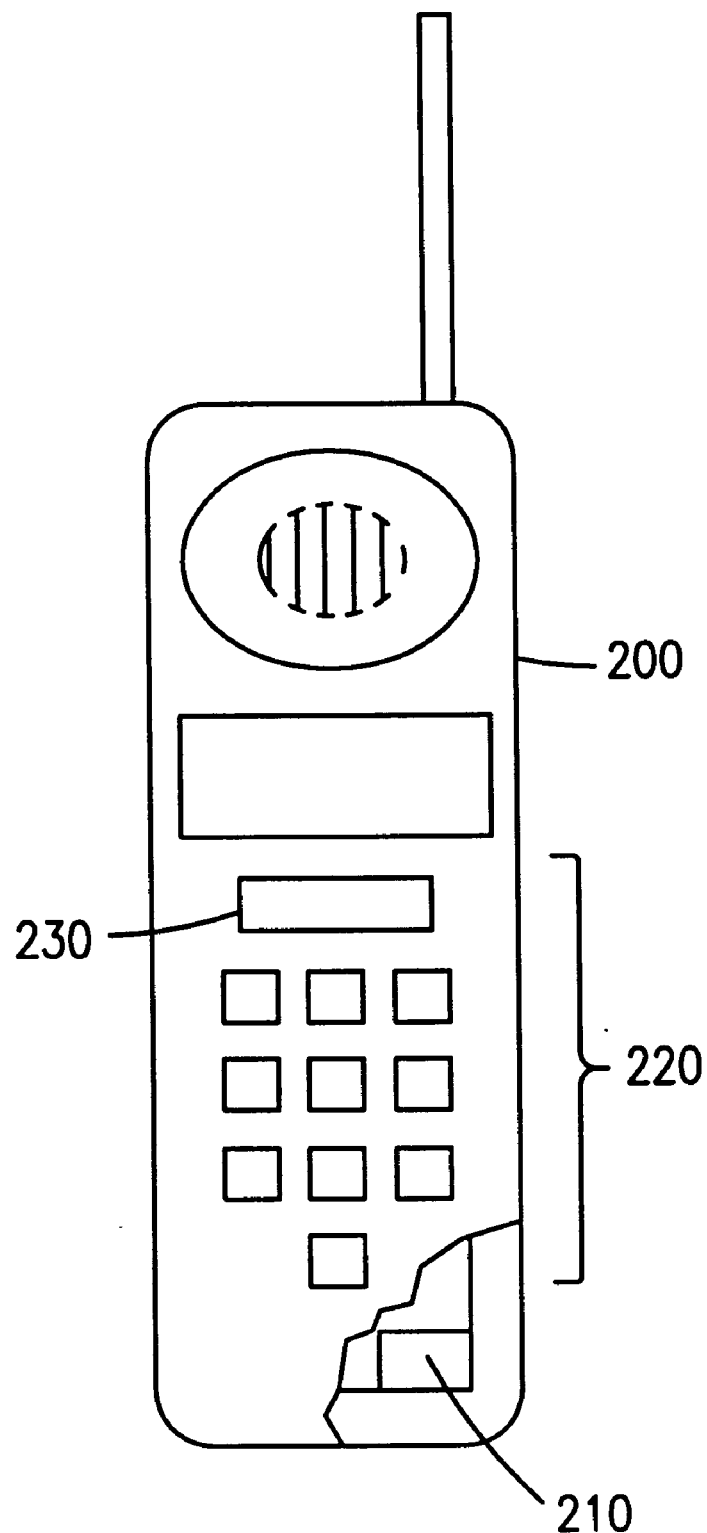
FIG. 2 illustrates an implementation of a cellular phone voice recording feature within a mobile station in accordance with preferred embodiments of the present invention.

With reference now to FIG. 2 of the drawings, in one embodiment of the present invention, information obtained during a call to or from a mobile station can be recorded within the mobile station (MS) 200 (mobile terminal) itself using several different procedures, two of which are discussed hereinbelow.

In a first embodiment of the MS-housed voice recording system of the present invention, a memory 210 can be included within the mobile station 200 to provide storage of information recorded during a call placed to or from the MS 200 for later retrieval by the subscriber. In addition, the keypad 220 on the mobile station 200 can be enhanced to include a RECORD key 230. When this RECORD key 230 is pressed by the subscriber, any information spoken by either the calling or called party will be recorded and stored in the memory 210. By pressing the RECORD key 230 a second time, the recording feature will be terminated. In an alternative embodiment, the recording feature can be started or stopped by pressing and holding, for a specified number of seconds, e.g., three seconds, an existing key (not shown), such as a function key, on the keypad 220.

In both of the hereinbefore discussed embodiments, the subscriber can access the stored information at a later time by pressing a function key (not shown) on the keypad 220, which may be the same key used for recording the information by pressing and holding it for a specified period of time. Typically, after depressing the function key, a code must be entered to instruct the MS to play back one of the recorded messages. By entering other codes, messages can also be saved or deleted.

The number of recorded messages allowed will depend on the amount of available memory 210. For example, memory 210 may only store up to ten messages at a time. In preferred embodiments, the subscriber will have the option of saving or deleting retrieved messages. Advantageously, providing this voice recording feature within the mobile station itself allows the feature to be implemented without requiring any administration within the Mobile Services Center/Visitor Location Register (MSC/VLR).

Figure 3:
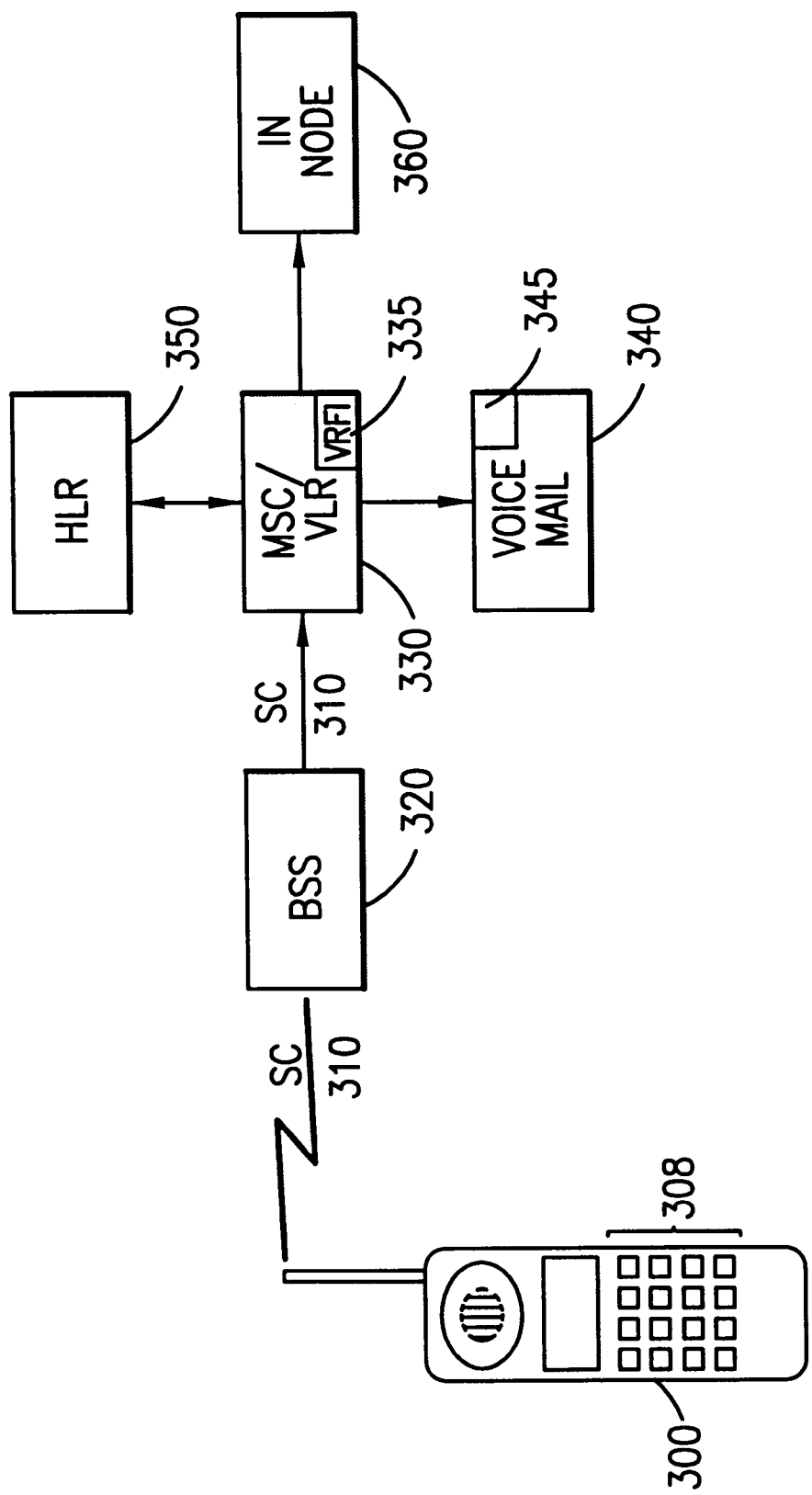
FIG. 3 depicts a sample embodiment of a network-housed cellular phone voice recording feature in accordance with preferred embodiments of the present invention.

In another embodiment of the present invention, shown in FIG. 3 of the drawings, the voice recording feature can be implemented within the MSC/VLR 330, which would allow network operators to charge subscribers a fee for this service, thereby increasing the revenue for these network operators. Furthermore, by implementing this feature in the MSC/VLR 330, the subscriber can purchase the voice recording feature without having to purchase a new cellular phone including this feature.

However, in order for the voice recording feature to be provisioned and activated, the subscriber must also purchase a voice mail feature for storage and retrieval of the recorded information. When the voice recording feature is provisioned for a subscriber, the voice recording feature information 335, e.g., the routing number associated with the subscribers voice mail system 340, and a Personal Identification Number (PIN) corresponding to the subscriber's voice mail box 345, e.g., a memory unit for storing the information, are stored in the MSC/VLR 330.

However, it should be noted that the voice recording feature information 335, e.g., the voice mail system telephone number and subscriber PIN, can be stored in other locations as well. For example, if the network operator for the subscriber is in the Intelligent Network (IN), the subscriber information stored in the VLR 330 from the HLR 350 will instruct the MSC 330 to route the voice recording request to an IN node 360, or other type of intelligent node, where the feature information 335 will be stored. Alternatively, the voice recording feature information 335 can also be stored in the HLR 350, which is transmitted to a VLR 330 when the MS 300 enters the service area allocated to that VLR 330. The MSC 330 can then retrieve that information from the VLR 330 in order to establish the three-way call connection.

The recording can be both started and stopped by the subscriber pressing a service code 310. In a GSM system, the Unstructured Supplementary Service Data (USSD) protocol would be used to transport the service code 310 to the MSC/VLR 330. Advantageously, the service code 310 can be sent without interrupting the call or placing the call on-hold, because USSD messages are transported outside of the speech channel. To activate this feature during a call, the subscriber can press a sequence of keys, e.g., #53 followed by #SEND, on a keypad 308 of the mobile station (MS) 300 to request voice recording. Based on the character set (*,#) in the pressed sequence, the mobile station 300 recognizes the key sequence as a USSD message and forwards the service code 310 to the MSC/VLR 330 via the Base Station System (BSS) 320 using the USSD protocol.

When the MSC/VLR 330 receives the USSD message with the service code 310 (the digits that the subscriber pressed) for this feature, a call is set up to the subscriber's voice mail 340, using the stored voice mail routing number and the subscribers PIN 335.

The voice mail recording may be disconnected at any time by the subscriber by pressing a sequence of keys on the keypad 308 or by normal call termination. If the recording feature is discontinued by normal call termination, e.g., the subscriber hangs up, the tearing down of the call in the MSC/VLR 330 follows the normal tear down for any multi-party call, which includes disconnecting the links between the MS 300 and the voice mail system 340 and the MS 300 and the calling or called party separately.

In the network-housed voice recording embodiment, the subscriber can retrieve the recorded information using the same procedure as that required for accessing voice mail. This typically includes calling a telephone number associated with the voice mail system 340, and entering the subscriber's PIN. This allows the subscriber to listen to messages, including voice recordings made during phone calls, delete messages, save messages, and other similar options depending upon the voice mail system 340 used.

Advantageously, by using the voice recording feature of the present invention, whether MS-housed or network-housed, the subscriber can accurately record information during a phone call without the need for recording materials, e.g., paper, and without risking his or her safety while driving.

As will be recognized by those skilled in the art, the innovative concepts described in the present application can be modified and varied over a wide range of applications. Accordingly, the scope of patented subject matter should not be limited to any of the specific exemplary teachings discussed.

What is claimed is:

1. A telecommunications system for recording information by a mobile subscriber within a cellular network during a call between said mobile subscriber and a third party, said telecommunications system comprising:

voice recording feature information associated with said mobile subscriber, said voice recording feature information being stored within said cellular network;

a voice mail system within said cellular network having a voice mail box associated with said mobile subscriber therein, said voice mail box for storing said information upon activation of said voice recording feature information;

a mobile terminal within said cellular network associated with said mobile subscriber for transmitting a first code during said call to activate said voice recording feature information; and a mobile services center in wireless communication with said mobile terminal for receiving said first code, accessing said voice recording feature information in response to said first code and establishing a multi-party call between said mobile subscriber, said third party and said voice mail box, said information being recorded and stored in said voice mail box during said multi-party call.

2. The telecommunications system of claim 1, wherein said multi-party call is terminated by said mobile terminal disconnecting said call between said mobile subscriber and said third party.

3. The telecommunications system of claim 1, wherein said mobile services center stores said voice recording feature information therein.

4. The telecommunications system of claim 1, wherein said voice recording feature information comprises a routing number for said voice mail system and a Personal Identification Number associated with said voice mail box.

5. The telecommunications system of claim 4, wherein said mobile subscriber retrieves said information stored in said voice mail box within said voice mail system by dialing said routing number and entering said Personal Identification Number on said mobile terminal, said mobile services center receiving said routing number and said Personal Identification Number from said mobile terminal and establishing a call connection between said voice mail box and said mobile terminal to enable said mobile subscriber to retrieve said information.

6. The telecommunications system of claim 1, wherein said multi-party call is disconnected by said mobile services center when said mobile services center receives a service code entered by said mobile subscriber on said mobile terminal, said call between said mobile subscriber and said third party not being disconnected.

7. The telecommunications system of claim 1, wherein said first code is sent to said mobile services center using an Unstructured Supplementary Service Data protocol.

8. The telecommunications system of claim 1, further comprising an intelligent node connected to said mobile services center, said intelligent node storing said voice recording feature information therein, said mobile services center retrieving said voice recording feature information from said intelligent node to establish said multi-party call.

9. The telecommunications system of claim 1, further comprising a Home Location Register connected to said mobile services center, said Home Location Register storing said voice recording feature information therein, said mobile services center retrieving said voice recording feature information from said Home Location register to establish said multi-party call.

10. The telecommunications system of claim 1, wherein said information comprises a conversation between said mobile subscriber and said third party.

11. A method for recording information by a mobile subscriber within a cellular network during a call between said mobile subscriber and a third party, comprising the steps of:

transmitting, by a mobile terminal associated with said mobile subscriber, a first code to a mobile services center in wireless communication with said mobile terminal within said cellular network;

accessing, by said mobile services center, voice recording feature information associated with said mobile subscriber within said cellular network in response to said first code;

establishing, by said mobile services center, a multi-party call between said mobile subscriber, said third party and a voice mail box associated with said mobile subscriber within a voice mail system within said cellular network; and recording said information in said voice mail box during said multi-party call.

12. The method of claim 11, further comprising the steps of:

disconnecting, by said mobile services center, said multi-party call; and terminating recording of said information in said voice mail box in response to said step of disconnecting.

13. The method of claim 12, wherein said step of disconnecting further comprises the step of:

disconnecting, by said mobile subscriber, said call between said mobile terminal and said third party to disconnect said multi-party call.

14. The method of claim 12, wherein said step of disconnecting further comprises the step of:

receiving at said mobile services center a service code entered by said mobile subscriber on said mobile terminal, said call between said mobile terminal and said third party not being disconnected.

15. The method of claim 11, further comprising the step of:

retrieving said information stored in said voice mail box within said voice mail system by said mobile subscriber.

16. The method of claim 15, wherein said voice recording feature information comprises a routing number for said voice mail system and a Personal Identification Number associated with said voice mail box; and wherein said step of retrieving further comprises the steps of:

dialing said routing number and entering said Personal Identification Number on said mobile terminal;

receiving at said mobile services center said routing number and said Personal Identification Number from said mobile terminal; and establishing, by said mobile services center a call connection between said voice mail box and said mobile terminal to enable said mobile subscriber to retrieve said information.

17. The method of claim 11, wherein said step of transmitting further comprises the step of:

transmitting said first code to said mobile services center using an Unstructured Supplementary Service Data protocol.

* * * * *